US006700341B2

(12) United States Patent
Schaer et al.

(10) Patent No.: US 6,700,341 B2
(45) Date of Patent: Mar. 2, 2004

(54) MICROCONTROLLER FOR AND A METHOD OF CONTROLLING OPERATION OF THE SAFETY CLUTCH OF A HAND-HELD ELECTRIC POWER TOOL

(75) Inventors: Roland Schaer, Grabs (CH); Hans Böni, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 64 days.

(21) Appl. No.: 09/933,970

(22) Filed: Aug. 21, 2001

(65) Prior Publication Data

US 2002/0053892 A1 May 9, 2002

(30) Foreign Application Priority Data

Aug. 24, 2000 (DE) ........................................ 100 41 632

(51) Int. Cl.[7] .................................................. H02P 7/00

(52) U.S. Cl. ....................... 318/432; 318/433; 318/434; 388/937

(58) Field of Search ................................. 318/432, 433, 318/434; 388/937; 180/142; 701/58

(56) References Cited

U.S. PATENT DOCUMENTS 5,238,079 A * 8/1993 Gorim ........................ 180/446
6,029,107 A * 2/2000 Sato ............................ 701/58

* cited by examiner

*Primary Examiner*—Karen Masih
(74) *Attorney, Agent, or Firm*—Sidley Austin Brown & Wood, LLP

(57) ABSTRACT

A microcontroller for controlling operation of a safety clutch of a hand-held electrical power tool and which is arranged in a force transmitting chain of the tool, with the microcontroller including a unit (2,5,4;8) for processing at least one parameter of the power tool and for outputting a resulting parameter in form of a calculated torque ($M^1$), and a control unit (7) for comparing an actually measured torque (M) with the calculated torque ($M^1$), and for outputting a control signal (θ) when a difference between the actually measured and calculated torques exceeds a predetermined threshold.

5 Claims, 3 Drawing Sheets

MICROCONTROLLER FOR AND A METHOD OF CONTROLLING OPERATION OF THE SAFETY CLUTCH OF A HAND-HELD ELECTRIC POWER TOOL

BACKGROUND OF THE INVENTION

1. Field of the Invention

The present invention relates to a hand-held electrical power tool such as, e.g., a drilling tool or a chiseling tool, including a safety clutch for breaking the force transmitting chain from the electrical drive to the working tool sprindle in case of dangerous operational conditions such as jamming of the working tool, and relates in particular to a microcontroller for controlling the safety clutch operation and a method of controlling the safety clutch operation.

2. Description of the Prior Art

With rotatable hand-held electrical power tools, jamming of a working tool, e.g., upon encountering a reinforcing iron during drilling bores in concrete, causes, as a result of high torque associated with jamming, rotation of the tool housing about the working tool axis, which can lead to an injury of the user. Such high torques are limited in the convention power tool with friction clutches which are arranged in the force transmitting chains of the power tools.

German Publication DE 3707052 discloses a hand-held electrical power tool with a microcontroller which in response to sensing of a rotational movement of the housing by acceleration sensor, actuates a safety clutch for breaking the force transmitting chain. A prerequisite for the use of the microcontroller is an availability of a free space for accommodating a slight movement of the housing. E.g., if a bore is formed immediately adjacent to a wall, the use of this power tool is not possible as a hand of the user can be clamped between the housing and the wall. For drilling immediately adjacent to a wall, additionally, a conventional friction clutch should be used in the power tool. This method, in addition, requires a relatively high computing power and, therefore, a very expensive microprocessor.

U.S. Pat. No. 5,563,463 discloses a hand-held electrical power tool which measures, in real time, with speed and further sensors, respectively, the rotational speed of the motor and the input current. The microcontroller, via appropriate hard- and software, controls and monitor the motor torque by using the measured rotational speed and input current of the motor. However, in the disclosed power tool, the interruption of the input current at an unpermissibly high torque leads, because of the inertia of the motor, to an unpermissibly large rotation of the housing.

German Publication DE 43 34 933 discloses a hand-held electrical power tool, in which a rotary vibration of the housing is sensed by acceleration sensors and, upon a missed zero crossing within a predetermined time period, the safety clutch is actuated and the force transmitting chain is broken. The drawback of the used solution consists in that at small vibrations, relatively small torque increases can lead to breaking of the force transmitting chain.

Accordingly an object of the present invention is to provide a microcontroller for a hand-held electrical power tool with a safety clutch which would actuate the clutch only at high torque increases.

SUMMARY OF THE INVENTION

This and other object of the present invention, which will become apparent hereinafter, are achieved by providing a microcontroller for controlling the operation of the safety clutch and including a unit for processing at least one parameter of the power tool and for outputting a resulting parameter in form of a calculated torque and a control unit for comparing an actually measured torque, which is inputted into the control unit as a first input parameter, with the calculated torque, which is inputted into the control unit as a second input parameter, and for outputting a control signal when a difference between the actually measured and calculated torques exceeds a predetermined threshold.

According to the first embodiment of the microcontroller according to the present invention, the processing unit includes a first calculation unit for transforming an input current of a power tool electromotor, which is inputted in the first calculation unit as an input parameter, over a motor diagram, into the calculated torque output.

Because of the dynamics of the power transmitting chain, e.g., because of the inertia of the rotor and of the torsional resistance of the force transmitting chain, the motor current is time-delayed with a filter of a first or higher order and react to the change of the torque. This dynamic, however, is not transformed in a locally calculated torque. A measure of the torque increase is the difference between the actually measured and calculated torques.

Advantageously, the processing unit further includes a second calculation unit for transforming a measured rotational speed of the power tool electromotor, which is inputted in the second calculation unit as an input parameter, over a friction diagram, into a friction torque at a second calculation unit output.

The determination of the calculated torque based on the rotational speed and the input current of the motor increases the precision of the calculation of the calculated torque.

In accordance with the second embodiment of the microcontroller according to the present invention, the processing unit includes a filter element in a form of a deep-pass filter which time-delays the locally calculated, by using the input current, torque and which outputs the calculated torque to the microcontroller.

Advantageously, the control unite of the microcontroller includes further time-delay and filter elements which prevent short torque peaks, which do not lead to deviation of the housing dangerous for the user, from causing the breaking of the force-transmitting chain.

Advantageously, the microcontroller additionally controls the braking of electric motor rotor. The braking is effected by feeding the remnant voltage of the rotor winding into the reversed polarized main winding by using an auxiliary winding.

The method of controlling of the operation of the safety clutch of the hand-held electrical power tool includes transforming an input current of a tool electromotor, by using a motor diagram into a locally calculated torque or transforming an electrically filtered actually measure torque into a locally calculated torque comparing a difference between the actually measured torque and the calculated torque with a redetermined threshold value, and outputting a control signal for actuating the safety clutch in response to the difference between the actually measured and the calculated torque exceeding the predetermined value.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiments, when read with reference to the accompanying drawings.

DETAILED PRESCRIPTION OF THE PREFERRED EMBODIMENTS

Figure 1:
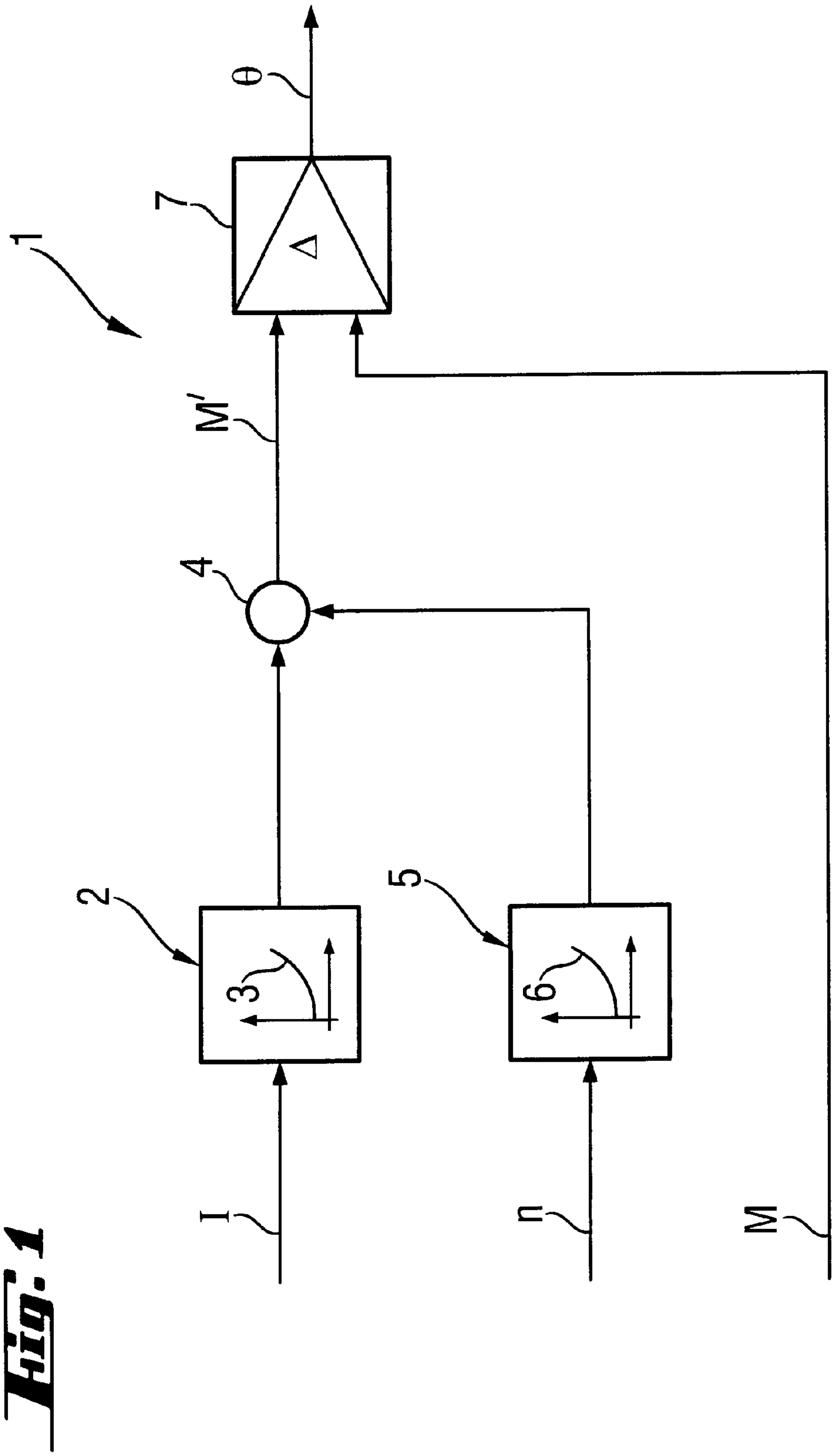
FIG. 1 a block-diagram of first embodiment of a microcontroller according to the present invention.
Figure 3:
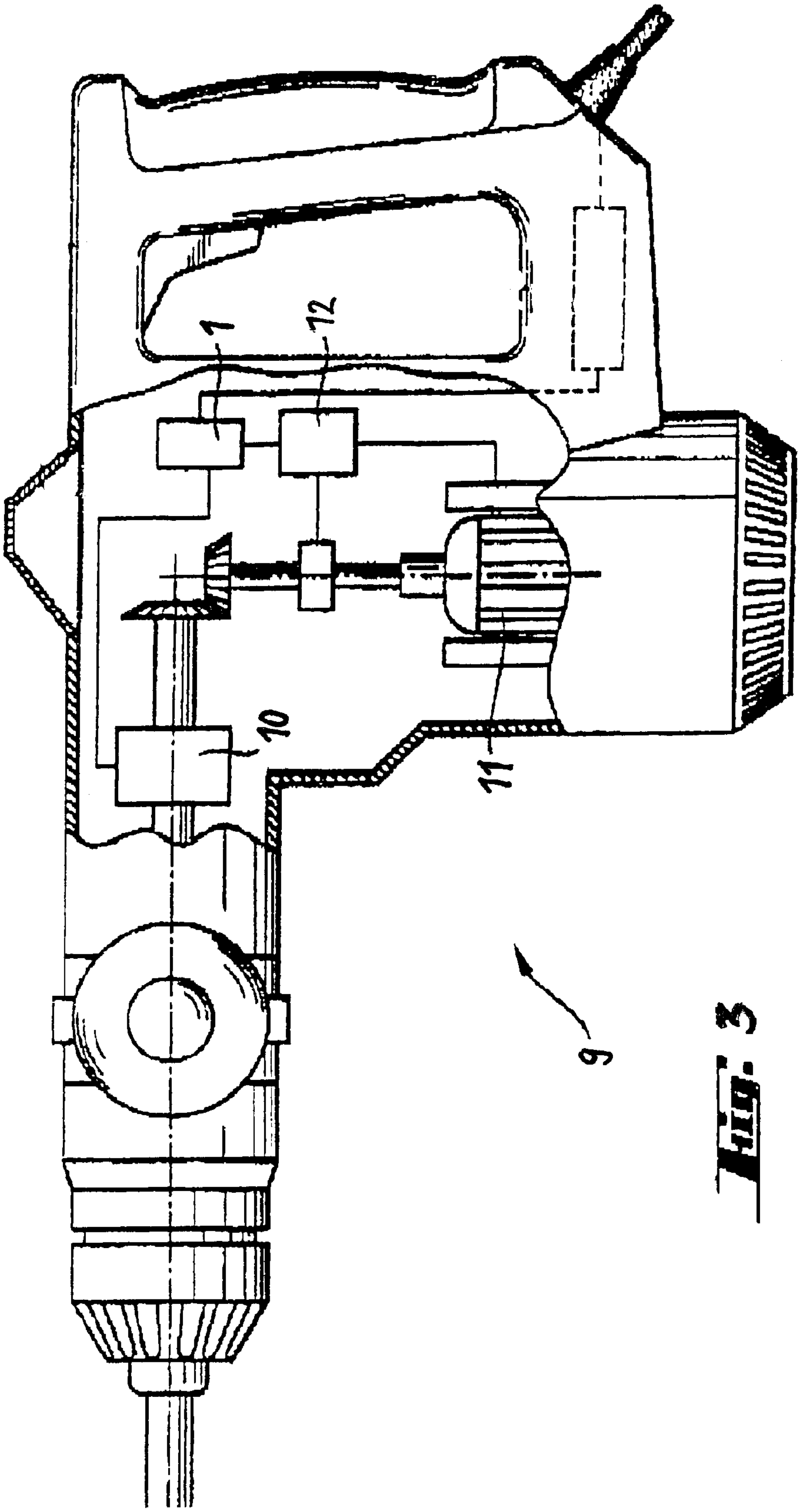
FIG. 3 a side, partially cross-sectional view of an electrical hand-held power tool with a safety clutch and a microcontroller for controlling the operation of the safety clutch.

FIG. 1 shows a block-diagram of a microcontroller according to the present invention for an electrical hand-held power tool (9) (shown in FIG. 3) that includes an electrically controlled safety clutch (10), which is provided in the force transmission chain of the power tool, an electric motor (11), and a controllable brake (12). The microcontroller 1 controls operation of the safety clutch in accordance with the following input parameters: torque M; input current I, and rotational speed of the electromotor n. In the first computation unit 2 of the microcontroller 1, the input current I of the electric motor is transformed, over the motor diagram 3, locally in an electrical torque at the output to which at a summation point 4, a calculated friction torque, which is obtained in a second calculation unit 5 by transformation of the input rotational speed over the friction diagram 6 in the calculated friction torque, is added. The sum of the electrical and friction torques is outputted as a stationary calculated torque $M^1$ which is inputted in a control unit 7 of the microcontroller 1 as an input parameter. In the control unit 7, the calculated torques $M^1$ is compared with the actually measured torque M, and the torque difference $\Delta$ is compared with a threshold parameter. If the torque difference $\Delta$ exceeds a predetermined threshold, the control unit 7 outputs a control signal $\theta$ which actuates the safety clutch (10) and the brake (12).

Figure 2:
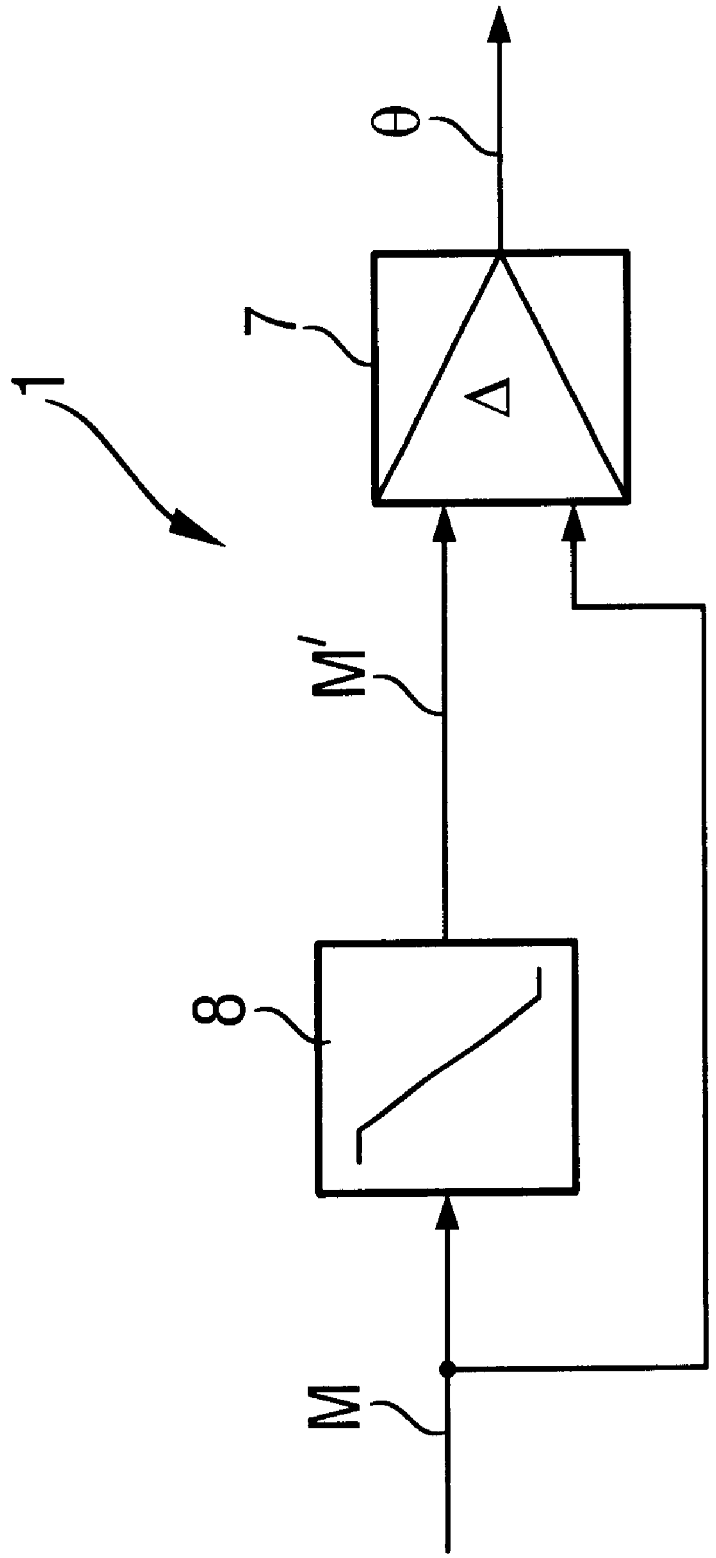
FIG. 2 a block-diagram of a second embodiment of a microcontroller according to the present invention.

In the embodiment of the microcontroller shown in FIG. 2, the microcontroller 1 includes a filter unit 8 to which the torque M is also communicated, in addition to being communicated to the control unit 7. In the filter unit 8, the torque M is time-delayed and is communicated to the control unit 7 of the microprocessor 1 in form of a calculated torque $M^1$ as a first input parameter. In the control unit 7, the calculated, in the filter unit 8, torque $M^1$ is compared with the actually measured torque M that is inputted into the control unit 7 as a second input parameter. As in the first embodiment of the microcontroller 1, the difference A between the calculated and the measured torque is compared with a predetermined threshold parameter. In case, the torque difference $\Delta$ exceeds the predetermined threshold parameter, the control unit 7 outputs a control signal $\theta$ that actuates the safety clutch and the brake which are operationally connected with the microcontroller.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. An electrical hand-held power tool, comprising an electromotor (11) for driving the power tool (9); a brake (12) for braking the electromotor; a safety clutch (10) arranged in a force transmitting chain of the power tool; and a microcontroller for controlling operation of the safety clutch (10), the microcontroller comprising means (2,5,4;8) for processing at least one parameter of the power tool and for outputting a resulting parameter in form of a calculated torque $M^1$; and a control unit (7) for comparing an actually measured torque M which is inputted in the control unit (7) as a first input parameter, with the calculated torque $M^1$ which is inputted into the control unit (7) as a second input parameter, and for outputting a control signal $\theta$ when a difference between the actually measured and calculated torques exceeds a predetermined threshold.

2. A power tool according to claim 1, wherein the processing means comprises a first calculation unit (2) for transforming an input current I of a power tool electromotor, which is imputted in the first calculation unit (2) as an input parameter, over a motor diagram (3), into the calculated torque $M^1$ and a control unit (7) for comparing an actually measured torque, which is inputted into the control unit (7) as a first input parameter, with the calculated torque M; at an output thereof.

3. A power tool according to claim 2, wherein the processing means comprises a second calculation unit (5) for transforming a measured rotational speed n of the power tool electromotor, which is imputted in the second calculation unit as an input parameter, over a friction diagram, into a friction torque at a second calculation unit output.

4. A microcontroller according to claim 3, wherein the processing means further comprises a summation point (4) having input means connected with the outputs of the first and second calculation units (2,5) and output means for outputting a calculated torque $M^1$ obtained by summation of input torques inputted from the first and second calculation units (2,5).

5. A power tool according to claim 1, wherein the processing means comprises a filter unit (8) for converting the actually measured torque M which is imputted therein, into the calculated torque $M^1$.

* * * * *